United States Patent
Watanabe (10) Patent No.: US 6,234,150 B1
(45) Date of Patent: May 22, 2001

(54) FUEL INJECTION CONTROL DEVICE

(75) Inventor: Tetsushi Watanabe, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/496,334

(22) Filed: Feb. 2, 2000

(30) Foreign Application Priority Data

Nov. 8, 1999 (JP) ................................................. 11-316569

(51) Int. Cl.$^7$ ................................................... F02M 51/00
(52) U.S. Cl. ............................ 123/490; 123/494; 361/154
(58) Field of Search ................................... 123/490, 494; 361/154

(56) References Cited

U.S. PATENT DOCUMENTS

| | | | |
|---|---|---|---|
| 5,531,198 | * 7/1996 | Matsuura | 123/490 |
| 5,992,391 | * 11/1999 | Yamakado et al. | 361/154 |
| 6,076,508 | * 6/2000 | Nakano | 123/490 |

FOREIGN PATENT DOCUMENTS 11-112014    4/2000  (JP).

* cited by examiner

Primary Examiner—Erick Solis
(74) Attorney, Agent, or Firm—Sughrue, Mion, Zinn, Macpeak & Seas, PLLC (57) ABSTRACT

A fuel injection control device expanding the dynamic range for controlling the amount of fuel and preventing the wasteful consumption of electric power. The device comprises fuel pressure regulator means 4 for adjusting the fuel pressure Pf, various sensors 3 inclusive of a fuel pressure sensor, injector drive means 5A for opening the valve body of an injector 2, and injection control means 1A for controlling the fuel pressure regulator means and the injector drive means depending on the operation conditions, wherein the injection control means 1A includes a holding current control unit 16A that variably sets the injector holding current iha depending on the fuel pressure in order to control the valve-opening time by controlling the exciting current ia and the excitation time of the injector, and variably sets the holding current to a minimum required value so that the holding current decreases with a decrease in the fuel pressure.

7 Claims, 5 Drawing Sheets

FUEL INJECTION CONTROL DEVICE

BACKGROUND OF THE INVENTION

1. Field of the Invention

The present invention relates to a fuel injection control device which feeds the fuel in an amount corresponding to the operation conditions into an internal combustion engine by controlling the fuel pressure injected from an injector and the time for opening the valve body of the injector. In particular, the invention relates to a fuel injection control device which does not wastefully consume the electric power and makes it possible to sufficiently expand the dynamic range in which the amount of fuel is controlled by shortening the time for opening and closing the valve body of the injector.

2. Prior Art

In the fuel injection control device for direct cylinder injection-type internal combustion engines for vehicles, in general, the fuel having a large pressure is injected from the injector since the fuel must be injected into a cylinder in which the pressure is elevated during the compression stroke.

In the fuel injection control device of this type, therefore, it is desired to drive the injector depending upon the fuel pressure since the effect of fuel pressure upon the valve body that opens and closes the injector is no longer negligible.

In the fuel injection control device of the direct cylinder injection type, further, strict limitation is imposed on the timing for injecting the fuel and a wide dynamic range is required for controlling the amount of fuel.

In order to expand the dynamic range for controlling the amount of fuel while shortening the operation time for opening and closing the valve body of the injector, therefore, there can be contrived a method of changing the operation time for opening the valve by not only variably setting the fuel pressure but also variably setting the over-excitation period in the initial operation for opening the valve body depending upon the fuel pressure.

A device which controls the over-excitation period at the time of opening the valve depending upon the fuel pressure and controls the holding current after the valve body has moved up to the fully opened position, has been concretely disclosed in the prior art (Japanese Patent Application No. 112014/1999) filed by the present applicant.

That is, in variably setting the over-excitation period depending upon the fuel pressure, when the fuel pressure is high, the time for opening the valve body is minimized by setting an over-excitation period for flowing a relatively large exciting current required for opening the valve body of the injector.

When the fuel pressure is low, the over-excitation period for opening the valve is set to a required shortest period to suppress an excess of exciting current at the time of opening the valve. At the time of closing the valve, the valve is closed during the period in which the holding current is flowing after the over-excitation period.

This makes it possible to maintain a maximum fuel control amount during the high fuel pressure and to set a minimum fuel control amount to a small value during the low fuel pressure, expanding the dynamic range for controlling the amount of fuel inclusive of varying the fuel pressure.

Here, the valve body of the injector receives not only the resilient force of the spring but also the reaction (force in the direction for closing the valve) that varies depending upon the fuel pressure. In order to maintain the valve opened overcoming the reaction due to the high fuel pressure, therefore, the holding current is set to a value for producing a sufficiently large suction force compatible with the reaction corresponding to a high fuel pressure.

When the fuel pressure is low, however, a small reaction acts upon the valve body of the injector. Therefore, the holding current that is set to cope with the high fuel pressure, becomes too great.

In a state where the holding current is too great, when the valve body is closed from a state where the holding current is flowing, the operation for closing the valve starts from the over-excited state. Despite the exciting current is shut off, therefore, an extended period of time is required until the residual magnetic flux (force for maintaining the valve opened) of the electromagnetic coil extinguishes, making it difficult to quickly close the valve.

The above-mentioned prior art will now be concretely described with reference to FIGS. 3 to 5.

Figure 3:
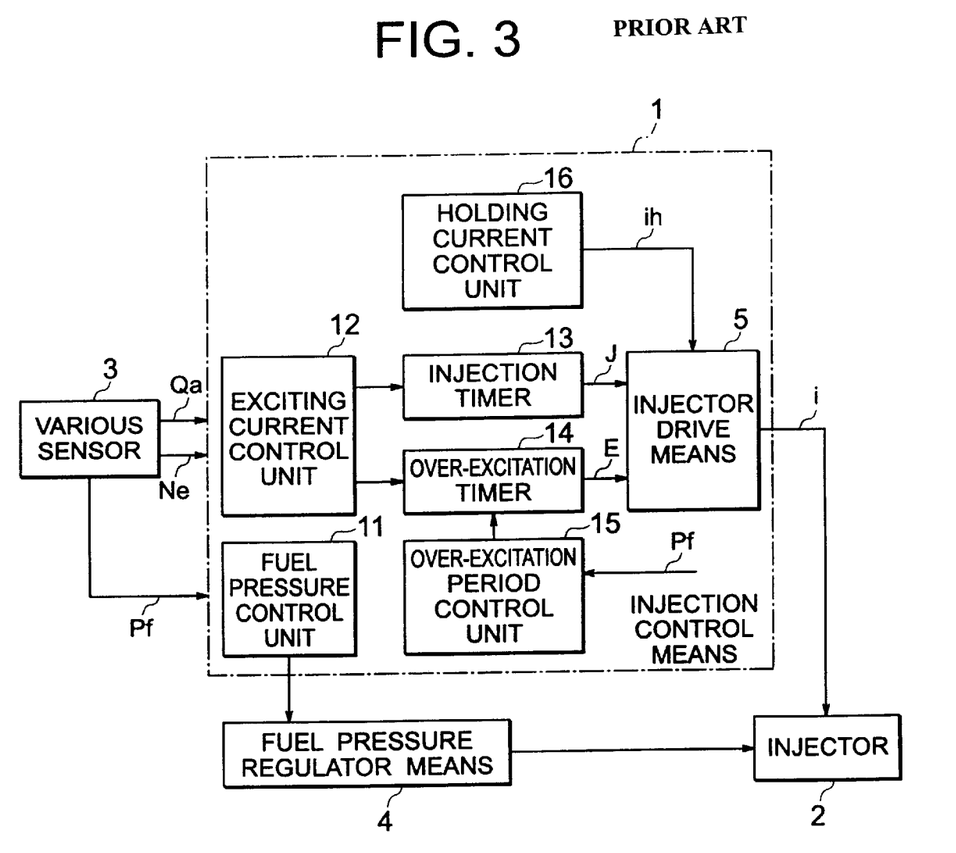
FIG. 3 is a functional block diagram illustrating a conventional fuel injection control device.

FIG. 3 is a functional block diagram illustrating a fuel injection control device which variably sets the over-excitation period depending upon the fuel pressure.

In FIG. 3, an injection control means 1 comprises an ECU (electronic control unit) which constitutes a main body of the fuel injection control device.

The injection control means 1 includes an injector 2, various sensors 3 and a fuel pressure regulator means 4, and controls the injector 2 depending upon the operation conditions to inject the fuel in a proper amount.

The injector 2 has a valve body opened and closed by an electromagnetic coil and a spring, and injects the fuel of a predetermined amount into an internal combustion engine being controlled by the injection control means 1.

The valve body of the injector 2, the electromagnetic coil for opening the valve body and the spring for closing the valve body will be described later with reference to FIG. 4.

When not energized, the valve body of the injector 2 is closed by the urging force of the spring. When a current is supplied to the electromagnetic coil, the valve body of the injector 2 is opened overcoming the urging force of the spring.

As described above, further, the valve body of the injector 2 receives the reaction in the direction of closing the valve due to the fuel pressure.

Various sensors 3 include, for example, an intake air amount sensor for detecting the amount Qa of the air taken in by the internal combustion engine, a rotational speed sensor for detecting the rotational speed Ne of the engine, and a fuel pressure sensor for detecting the pressure Pf of the fuel injected from the injector 2. The sensors 3 detect the operation conditions of the internal combustion engine and send signals to the injection control means 1.

The fuel pressure regulator means 4 adjusts the pressure Pf of the fuel that is to be injected from the injector 2.

An injector drive means 5 excites the electromagnetic coil to open the valve body of the injector 2. Here, the injector drive means 5 is included in the injection control means 1. The injector drive means 5, however, may be provided on the outer side of the injection control means 1.

The injection control means 1 further includes a fuel pressure control unit 11, an exciting current control unit 12, an injection timer 13, an over-excitation timer 14, an over-excitation period control unit, and a holding current control unit 16.

The fuel pressure control unit 11 in the injection control means 1 operates a target fuel pressure based on the operation conditions and controls the fuel pressure regulator means 4 depending on the target fuel pressure. Then, the fuel pressure regulator means 4 feeds a required fuel pressure Pf that complies with the operation conditions to the injector 2.

The exciting current control unit 12 controls the injection timer 13 and the over-excitation timer 14 depending upon the operation conditions and the fuel pressure Pf, controls the exciting current i fed to the electromagnetic coil and the excitation time through the injector drive means 5, and controls the time for opening the valve of the injector 2.

The injection timer 13 produces an injection pulse J corresponding to the time for opening the valve body of the injector 2.

The over-excitation timer 14 produces an over-excitation pulse E corresponding to the over-excitation period in the initial period of time for opening the valve body.

The over-excitation period control means 15 variably sets the setpoint value of the over-excitation timer 14 depending on the fuel pressure Pf, and adjusts the over-excitation period for feeding a large over-exciting current when the valve is to be opened.

The holding current control unit 16 sets the exciting current of the electromagnetic coil after the valve body has been opened as a holding current ih, and sends the holding current ih to the injector drive means 5.

The injection control means 1 constitutes an injector control unit. The over-excitation timer 14 and the over-excitation period control unit 15 in the injection control means 1 constitute an over-excitation control unit for feeding a large over-exciting current at the time of opening the valve body.

Due to the over-excitation period control unit 15 and the holding current control unit 16 in the injection control means 1, the exciting currents i of two steps for over-excitation and for holding, are used as electric currents that flow into the electromagnetic coil at the time of opening the valve body of the injector 2.

That is, in the initial operation for opening the valve, a large exciting current i (over-exciting current) is initially fed to shorten the time for opening the valve body. After the valve body has been opened, the exciting current i is decreased to a minimum holding current just enough for holding the valve body opened to prevent the electromagnetic coil from burning and to decrease the consumption of electric power.

Figure 4:
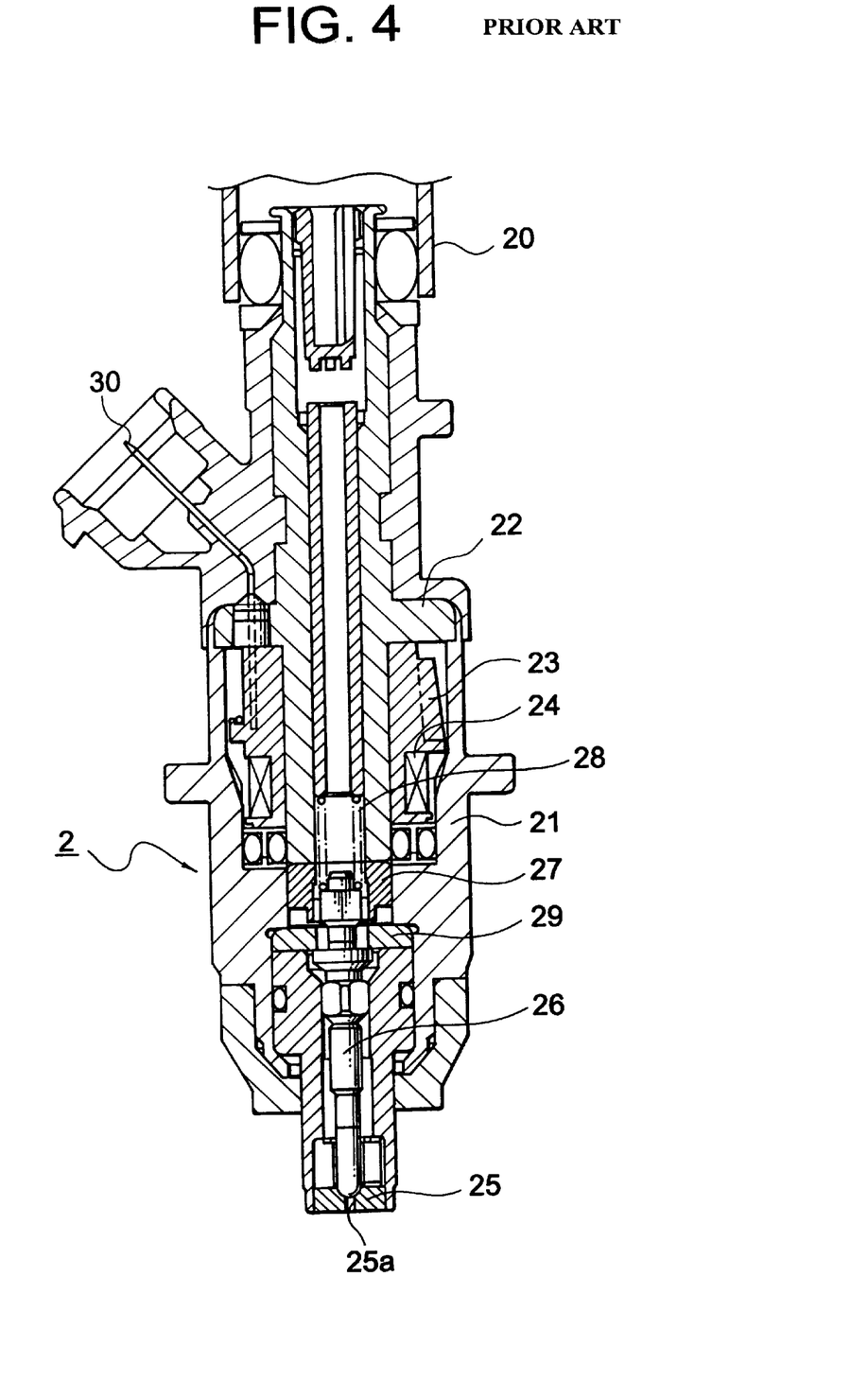
FIG. 4 is a sectional view illustrating the structure of a general injector.

FIG. 4 is a sectional view illustrating the structure of a general injector 2 disclosed in, for example, Japanese Unexamined Patent Publication (Kokai) No. 47208/1998.

In FIG. 4, a fuel feed pipe 20 is provided at one end of the injector 2, and the fuel having a pressure controlled by the fuel pressure regulator means 4 is fed through the fuel feed pipe 20.

A core 22 made of a magnetic material is integrally provided in a housing 21 of the injector 2, and an electromagnetic coil 24 is wound on the core 22 via a bobbin 23.

A valve seat 25 having an orifice 25a for injecting the fuel is provided in an opening at an end of the housing 21 of a cylindrical shape, and a valve body 26 of the shape of a needle is contained in the housing 21 so as to move in the axial direction.

An armature 27 made of a magnetic material is integrally provided for the valve body 26, and an end of the armature 27 is opposed to an end of the core 22.

The valve body 26 is urged by a spring 28 in a manner that an end thereof is brought into contact with the orifice 25a with the application of pressure (in a direction of closing the valve).

A spacer 29 is interposed between the valve body 26 and the housing 21.

The electromagnetic coil 24 is supplied with the exciting current i from the injection control means 1 through a terminal 30 provided being directed outward.

When the exciting current i flows into the electromagnetic coil 24, a magnetic flux generates in a magnetic circuit constituted by the housing 21, core 22 and armature 27, whereby the valve body 26 as well as the armature 27 are attracted by the core 22, a gap develops between the end of the valve body 26 and the orifice 25a, and the fuel is injected.

At this moment, the valve body 26 has been urged toward the side of the orifice 25a (direction of closing the valve) due to the fuel pressure Pf (reaction) received from the side of the fuel feed pipe 20. It needs not be pointed out that the reaction due to the fuel pressure Pf increases with an increase in the fuel pressure Pf.

Figure 5:
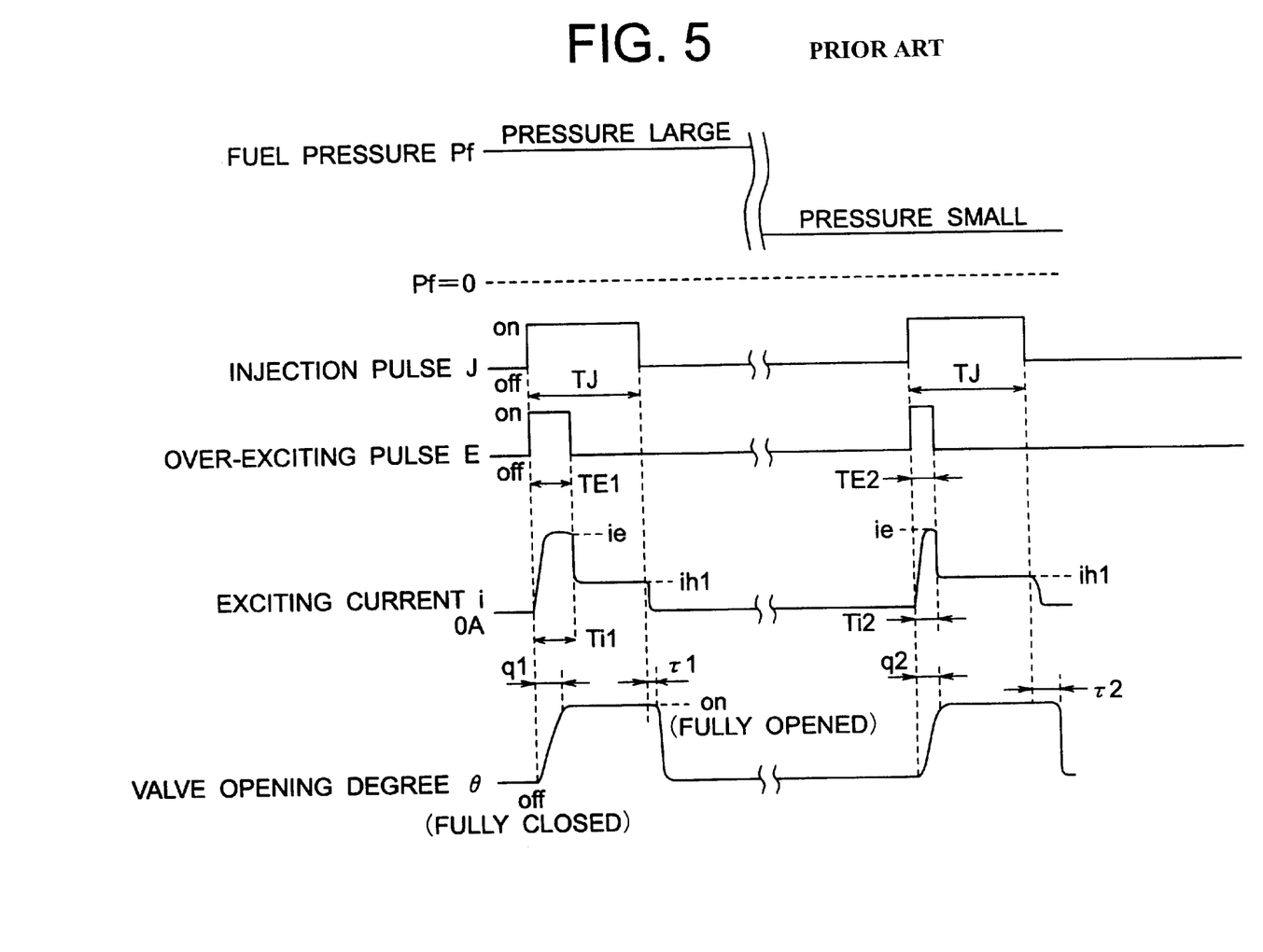
FIG. 5 is a diagram of waveforms illustrating the injector control operation in the conventional fuel injection control device.

FIG. 5 is a diagram of waveforms illustrating changes in the fuel pressure Pf, injection pulse J and exciting current i with the passage of time together with the valve body opening degree θ of the injector 2 according to the prior art.

In FIG. 5, the ON period TJ of the injection pulse J is set depending upon the operation conditions.

The ON period TE1 of the over-exciting pulse E (waveform of exciting current i) is variably set by the over-excitation timer 14 and by the over-excitation period control unit 15 depending on the fuel pressure Pf.

That is, when the fuel pressure Pf is high, the ON period TE1 of the over-exciting pulse E is set to be relatively long. When the fuel pressure Pf is low, the ON period TE2 of the over-exciting pulse E is set to be shorter than the ON period TE1.

A large over-exciting current ie is fed during the over-excitation period Ti1 or Ti2 at the start of opening the valve body.

The holding current ih1 after the valve body has been opened is controlled by the holding current control unit 16 through the injector drive means 5.

The valve body opening degree θ of the injector 2 is turned on (fully opened) or off (fully closed) depending on the on and off of the injection pulse J.

The valve-opening times q1 and q2 are the times required by the valve body 26 to move from the off (fully closed) position to the on (fully opened) position in the over-exciting periods Ti1 and Ti2, and are lengthened with an increase in the fuel pressure Pf, maintaining a relationship q1>q2.

The valve-closure start times τ1 and τ2 are required by the valve body 26 to start returning from the fully opened position to the fully closed position when the injection pulse J is off, and are lengthened with a decrease in the fuel pressure Pf, maintaining a relationship τ1<τ2.

The operation of the conventional device shown in FIGS. 3 and 4 will now be concretely described with reference to the diagram of waveforms of FIG. 5.

FIG. 5 shows the states of the injection pulse J, over-exciting pulse E, exciting current i and valve body opening degree θ of the injector 2 of when the fuel pressure Pf has changed in large and small two steps.

First, described below is when the fuel pressure Pf is great.

The fuel pressure control unit 11 and the exciting current control unit 12 in the injection control means 1 receive the engine rotational speed Ne, fuel pressure Pf and intake air amount Qa from various sensors 3 as main input signals.

The exciting current control unit 12 judges the operation conditions of the internal combustion engine, operates the fuel injection timing and data for controlling the amount of injection, and forms an injection pulse J and an over-exciting pulse E through the injection timer 13 and the over-excitation timer 14.

Based on the injection pulse J, over-exciting pulse E and holding current ih, the injector drive means 5 forms an exciting current i for the electromagnetic coil 24, and opens and closes the valve body 26 to control the amount of fuel injection. On the other hand, the fuel pressure regulator means 4 controls the fuel pressure Pf depending on the operation conditions.

In FIG. 5, the on period TJ of the injection pulse J is an on instruction period for the injector drive means 5.

The over-exciting pulse E is turned on simultaneously with the start of the injection pulse J, and sets the on period TE1.

When the injection pulse J and the over-exciting pulse E are simultaneously input, the injector drive means 5 gives priority to the on period TE1 of the over-exciting pulse E and supplies an over-exciting current ie as the exciting current i during the over-excitation period Ti1.

When the on period TE1 of the over-exciting pulse E ends, the over-excitation period Ti1 of the over-exciting current ie ends, too.

In FIG. 5, the over-exciting current ie has a trapezoidal waveform to which only, however, the waveform is in no way limited.

Upon feeding the over-exciting current ie to the electromagnetic coil 24 during the over-excitation period Ti1, the valve body 26 is opened within a relatively short valve-opening time q1, and the valve body opening degree θ is shifted from the fully closed position to the fully opened position.

Next, the holding current control unit 16 controls the exciting current i relying on the holding current ih1 that has been set in advance from when the on period TE1 of the over-exciting pulse E has terminated until when the on period TJ of the injection pulse J terminates.

Here, the holding current ih1 is set to a required minimum value that is sufficient for maintaining the valve body 26 opened to cope even with a case where the fuel pressure Pf is high.

Next, when the on period TJ of the injection pulse J ends, the exciting current i is no longer fed from the injector drive means 5, and the exciting current i is shut off from the holding current ih1 to 0 [A].

As the exciting current i is shut off, the valve body 26 is pushed back by the urging force of the spring 28 and starts closing from the on (fully opened) position to the off (fully closed) position.

The valve-closure start time τ1 is determined not only by the urging force of the spring 28 but also depending on a balance between the holding current ih1 of just before the exciting current i is shut off and the reaction acting on the valve body due to the fuel pressure Pf.

Next, described below is the operation of when the fuel pressure Pf is small.

First, an on period TE2 (<TE1) of the over-exciting pulse E sets an over-exciting period Ti2 which is shorter than that of when the fuel pressure Pf is great.

In this case, the reaction (force in the direction of closing the valve) acting on the valve body due to the fuel pressure Pf becomes smaller than that of when the fuel pressure Pf is great. Accordingly, the valve-opening time q2 of the valve body opening degree θ of the injector 2 becomes shorter than the valve-opening time q1 of when the fuel pressure Pf is great.

After the exciting current has been shut off, on the other hand, the valve-closure start time τ2 becomes longer than the valve-closure start time τ1 of when the fuel pressure Pf is great despite the holding current ih1 of just before the shutting off remains the same, since the reaction due to the fuel pressure Pf is small.

Upon setting the holding current ih1 to correspond to the large fuel pressure Pf as described above, the valve-opening time q2 of the injector becomes short and, on the other hand, the valve-closure start time τ2 becomes long when the fuel pressure Pf is small.

When the fuel pressure Pf is small, in particular, the valve-closure start time τ2 becomes very long since the magnetic flux is produced in excess amounts by the holding current ih1 and an extended period of time is required until the residual magnetic flux in the electromagnetic coil 24 extinguishes.

On account of the foregoing reasons, the effective valve-opening period TP1 of when the fuel pressure Pf is great and the effective valve-opening period TP2 of when the fuel pressure Pf is small are given by the following formulas (1) and (2), respectively, $$TP1 = TJ - q1 + \tau1 \quad (1)$$

$$TP2 = TJ - q2 + \tau2 \quad (2)$$

In the formulas (1) and (2) as described above, there hold a relationship q1>q2 between the valve-opening times q1 and q2, and a relationship τ1<τ2 between the valve-closure start times τ1 and τ2. Accordingly, there holds a relationship TP1<TP2 between the effective valve-opening periods TP1 and TP2, and the effective valve-opening period TP2 becomes long when the fuel pressure Pf is small.

Therefore, the principal object of decreasing the fuel pressure Pf (decreasing the flow rate of the fuel) is not accomplished to a sufficient degree. Despite the fuel pressure Pf is decreased, therefore, the dynamic range for controlling the amount of fuel is not expanded as desired.

As described above, the conventional fuel injection control device accomplishes the object of expanding the dynamic range by optimizing the valve-opening time by variably setting the over-excitation period depending on the fuel pressure but still involves a problem in that the holding current is set to a large value irrespective of the fuel pressure and, hence, the holding current becomes too great when the fuel pressure is low, wastefully consuming the electric power, causing the operation for closing the valve to be delayed and making it difficult to sufficiently expand the dynamic range for controlling the amount of fuel.

SUMMARY OF THE INVENTION

The present invention was accomplished in order to solve the above-mentioned problem, and its object is to provide a fuel injection control device which does not wastefully consume the electric power, shortens the operation time for opening and closing the valve body of the injector (particularly the valve-closure start time) and sufficiently expands the dynamic range for controlling the amount of fuel.

A fuel injection control device according to the present invention comprises:

an injector having a valve body opened and closed by an electromagnetic coil and a spring to inject the fuel in a desired amount into an internal combustion engine;

a fuel pressure regulator means for adjusting the pressure of the fuel to be injected from the injector;

an injector drive means for opening the valve body of the injector;

various sensors for detecting the operation conditions of the internal combustion engine; and an injection control means for controlling the fuel pressure regulator means and the injector drive means depending upon the operation conditions, so that the fuel is injected in an amount corresponding to the operation conditions from the injector; wherein the various sensors include at least a fuel pressure sensor for detecting the fuel pressure;

the injection control means includes an injector control unit that controls the time for opening the valve body by controlling the exciting current flowing into the electromagnetic coil and the excitation time depending upon the operation conditions and the fuel pressure;

the injector control unit includes a holding current control unit for setting the exciting current flowing into the electromagnetic coil as a holding current after the valve body has been opened; and wherein, the holding current control unit sets the holding current to a minimum value necessary for maintaining the valve body opened, sets the holding current to a large value when the fuel pressure is high and sets the holding current to a small value when the fuel pressure is low.

In the fuel injection control device according to the present invention, the holding current control unit sets the holding current depending upon the fully closing time required by the valve body to move from the fully opened position to the fully closed position when the exciting current is shut off, and sets the holding current to a large value when the fully closing time is short.

In the fuel injection control device according to the present invention, the holding current control unit includes map data in which the closing times based on the fuel pressures are corresponded to the holding currents, the holding currents in the map data being grouped into a plurality of steps depending on the ranges of the closing time.

In the fuel injection control device according to the present invention, the fuel injection control means includes a fuel pressure control unit for operating a target fuel pressure that serves as a target of control by the fuel pressure regulator means, the fuel pressure control unit working as the fuel pressure sensor, sending the target fuel pressure to the holding current control unit as data corresponding to the fuel pressure, and the holding current control unit setting the holding current depending on the target fuel pressure.

In the fuel injection control device according to the present invention, the injector control unit includes an over-excitation control unit for feeding a large over-exciting current at the time of opening the valve body.

In the fuel injection control device according to the present invention, the over-excitation control unit includes an over-excitation period control unit for adjusting the over-excitation period for feeding the over-exciting current depending on the fuel pressure, the over-excitation period control unit variably setting the over-excitation time within a required minimum range shorter than the time for exciting the electromagnetic coil, setting the over-excitation period to be long when the fuel pressure is high and setting the over-excitation period to be short when the fuel pressure is low.

In the fuel injection control device according to the present invention, the injection control means includes a fuel pressure control unit for operating a target fuel pressure that serves as a target of control by the fuel pressure regulator means, the fuel pressure control unit working as the fuel pressure sensor and sending the target fuel pressure to the over-excitation period control unit as data corresponding to the fuel pressure, and the over-excitation period control unit setting the over-excitation period depending upon the target fuel pressure.

DESCRIPTION OF THE PREFERRED EMBODIMENTS

Embodiment 1

An embodiment 1 of the present invention will now be described with reference to the drawings.

Figure 1:
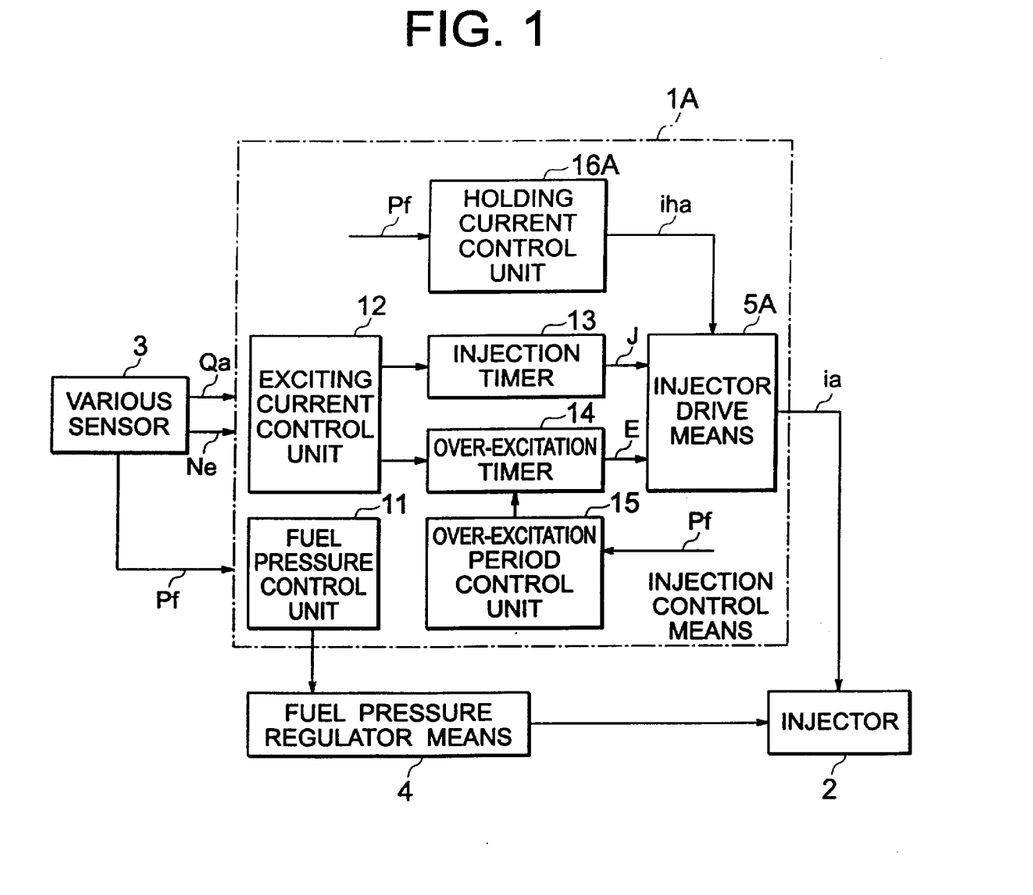
FIG. 1 is a functional block diagram illustrating an embodiment 1 of the present invention.

FIG. 1 is a functional block diagram illustrating the embodiment 1 of the present invention, and wherein the same portions as those described above (see FIG. 3) are denoted by the same reference numerals but are not described in detail again. The structure of the injector 2 is as shown in FIG. 4.

In FIG. 1, the over-excitation period control unit 15 adjusts, depending on the fuel pressure Pf, the over-excitation period for feeding the over-excitation current in the same manner as described above, and variably sets the over-excitation period within a required minimum range shorter than the time for exciting the electromagnetic coil 24 (see FIG. 4) and sets the over-excitation period to be long when the fuel pressure Pf is high.

In the same manner as described above, further, the holding current control unit 16A in the injection control means 1A sets the holding current iha to a minimum value that is required for maintaining the valve body 26 opened.

In this case, the holding current control unit 16A receives the fuel pressure Pf as input data, sets the holding current iha to a large value when the fuel pressure Pf is high and sets the holding current iha to a small value when the fuel pressure Pf is low.

Further, the holding current control unit 16A sets the holding current iha depending on the fully closing time required by the valve body 26 to move from the fully opened position to the fully closed position (valve body opening degree θ=0) at the time when the exciting current i is shut off.

That is, it is so regarded that the shorter the fully closing time, the larger the urging force of the valve body 26 in the fully closing direction and the reaction, and the holding current control unit 16A sets the holding current iha to a large value.

Concretely speaking, the storage means (not shown) of the holding current control unit 16A is storing, in advance, map data in which the fully closing times of the valve body 26 are corresponded to the minimum required holding currents iha.

Therefore, the holding current control unit 16A operates, using the map, the fully closing time of the valve body 26 corresponding to the urging force of the spring 28 and the fuel pressure Pf, and determines the holding current iha by making reference to the map data.

The fully closing time corresponding to the urging force of the spring 28 is obtained as predetermined measured data at the time of mass-producing the injectors 2. Further, the fully closing times corresponding to the fuel pressures Pf are obtained as the measured data corresponding to the fuel pressures Pf of a plurality of steps at the time of testing the injector 2, and are stored in the holding current control unit 16A in advance.

An increase in the number of map data drives up the cost. Therefore, the holding current iha in the map data is not continuously set for every fully closing time but is set so will not to hinder the operation for controlling the valve body 26, and is set in two to three steps for every range of the fully closing time.

When the map data are set in three steps, for example, the holding current iha assumes a maximum value for a (short) fully closing time corresponding to a large (near upper limit) fuel pressure Pf, assumes an intermediate value for the fully closing time corresponding to an intermediate fuel pressure Pf, and assumes a minimum value for a (long) fully closing time corresponding to a small (near lower limit) fuel pressure Pf.

The injector drive means 5A produces an exciting current ia depending on the injection pulse J, over-exciting pulse E and holding current iha, and drives the injector 2 as will be described later.

Figure 2:
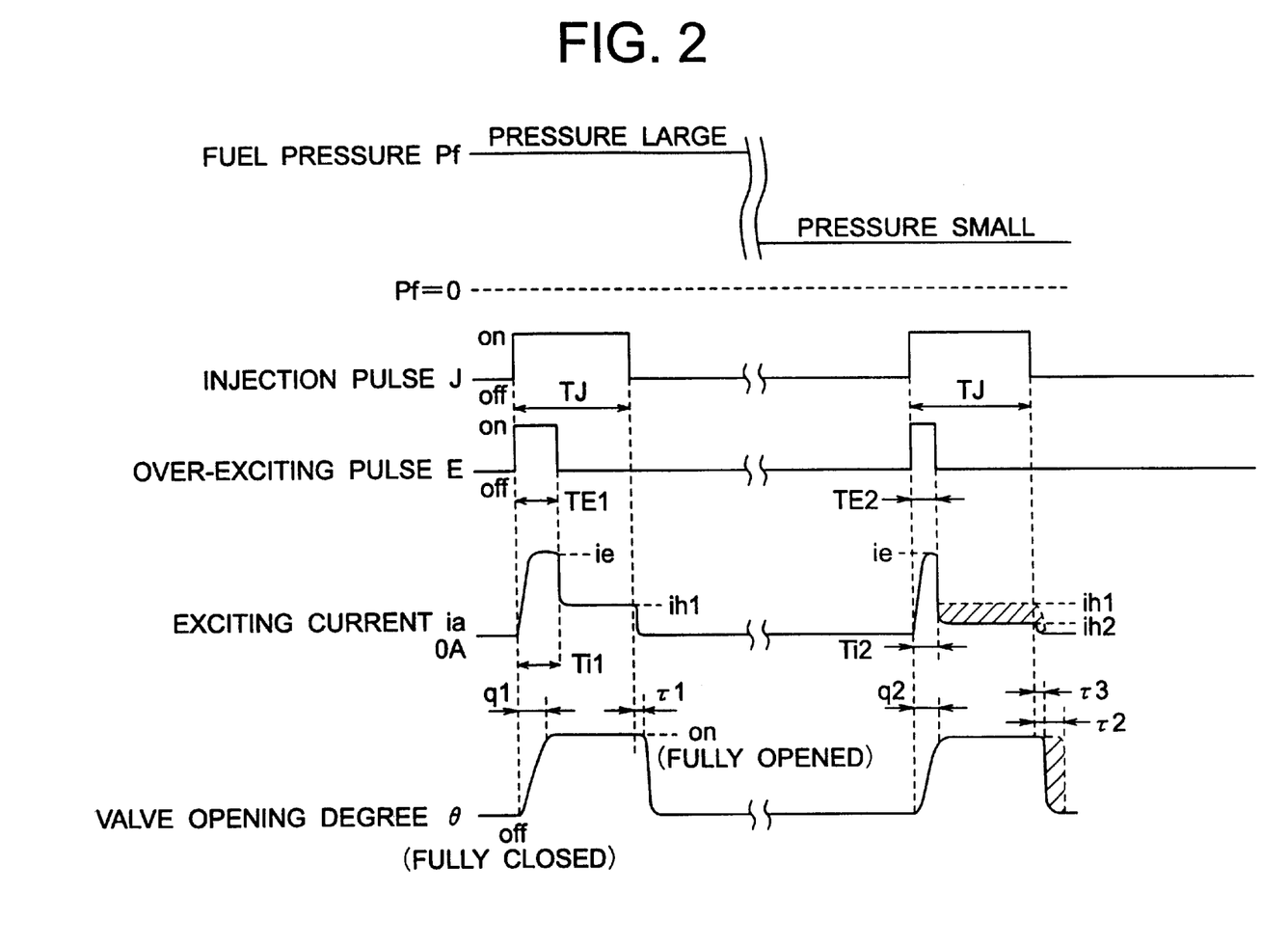
FIG. 2 is a diagram of waveforms illustrating the injector control operation according to the embodiment 1 of the present invention.

FIG. 2 is a diagram of waveforms illustrating the operation for controlling the injector 2 according to the embodiment 1 of the present invention, wherein the same portions as those described above (see FIG. 5) are denoted by the same reference numerals but are not described in detail again.

When the fuel pressure Pf is low, in this case, the exciting current ia flowing into the electromagnetic coil 24 is suppressed to a holding current ih2 which is lower than the above-mentioned holding current ih1 (broken line) by a hatched portion.

Thus, upon setting the holding current ih2 to a small value at the time when the exciting current ia is shut off, the residual magnetic flux decreases, and the valve-closure start time $\tau 3$ becomes shorter than the above-mentioned valve-closure start time $\tau 2$ (broken line) by a hatched portion.

The operation of the embodiment 1 of the present invention shown in FIG. 1 will now be concretely described with reference to the waveform diagram of FIG. 2 and FIG. 4.

The operation for opening and closing the valve body 26 when the fuel pressure Pf is great and the valve-opening start operation of when the fuel pressure Pf is small, are the same as those described above, and are not repeated here again.

In FIG. 2, when the fuel pressure Pf is small, the exciting current ia flowing into the electromagnetic coil 24 after the valve body has been opened is suppressed to the holding current ih2 to comply with the fuel pressure Pf, and is shut off after the passage of the on period TJ of the injection pulse J.

The valve-closure start time $\tau 3$ of the injector 2 is determined by the operation of the valve body 26 that is pushed back from the fully opened position to the fully closed position by the urging force of the spring 28 and by the reaction of the fuel pressure Pf after the exciting current ia (holding current ih2) is shut off to 0 [A].

In this case, the holding current ih2 is small compared to the one mentioned above (see broken line and hatched portion) and the excess component decreases in the magnetic flux generated by the holding current ih2. Accordingly, the residual magnetic flux extinguishes within a short period of time, and the valve-closure start time $\tau 3$ becomes shorter than the above-mentioned valve-closure start time $\tau 2$.

That is, the effective valve-opening period TP3 of when the fuel pressure Pf is small is given by the following formula (3), $$TP1=TJ-q2+\tau 3 \qquad (3)$$

In the formula (3), $\tau 3<\tau 2$ and, hence, the effective valve-opening period TP3 of when the fuel pressure Pf is small becomes shorter than the effective valve-opening period TP2 given by the above-mentioned formula (2).

As the fuel pressure Pf decreases, therefore, the flow rate of fuel decreases, which is-the principal object and, besides, the dynamic range for controlling the amount of fuel expands.

Since the holding current iha is set depending upon the time for closing the valve body 26 from the fully opened position to the fully closed position, it is allowed to feed a minimum of required holding current iha to suppress the wasteful consumption of electric power.

Further, the holding current control unit 16A includes map data in which the fully closing times of the valve body 26 (correspond to the urging force of the spring 28 and the fuel pressure Pf) are corresponded to the holding currents iha, and the holding currents iha in the map data are stepwisely set for the ranges of the fuel pressure. This makes it possible to suppress the holding currents iha to a minimum required number of data and to expand the dynamic range for controlling the amount of fuel without driving up the cost.

Embodiment 2

In the above-mentioned embodiment 1, provision was made of the fuel sensor for detecting the fuel pressure Pf as one of the various sensors 3. However, the fuel pressure control unit 11 may be used as the fuel pressure sensor, and a target fuel pressure may be input, as data corresponding to the fuel pressure Pf, to the over-excitation period control unit 15 and to the holding current control unit 16A.

In this case, the over-excitation period control unit 15 and the holding current control unit 16A regard the target of control (target fuel pressure) by the fuel pressure regulator means 4 as a detected value of the fuel pressure Pf, and sets the over-excitation period and the holding current iha depending on the target fuel pressure.

By using the target fuel pressure operated by the fuel pressure control unit 11 as the detected data of fuel pressure Pf, it is allowed to omit the fuel pressure sensor and to decrease the cost.

Embodiment 3

In the above-mentioned embodiment 1 (see FIG. 2), the over-exciting pulse E and the holding current iha were variably set in two steps depending upon the fuel pressure Pf. They, however, may be variably set in any number of steps of not smaller than three steps depending upon the fuel pressure Pf.

When there is a margin in the memory capacity in the injection control means 1A and in the cost of production, the over-exciting pulse E and the holding current iha may be continuously varied depending on the fuel pressure Pf.

Embodiment 4

In the above-mentioned embodiment 1, not only the holding current iha but also the over-exciting pulse E were variably set depending on the fuel pressure Pf. However, the holding current iha only may be variably set depending on the fuel pressure Pf.

In this case, too, the valve-closure start time TP3 becomes short at the time when the exciting current ia is shut off when the fuel pressure Pf is small, exhibiting the same functions and effects as those described above.

What is claimed is:

1. A fuel injection control device comprising:

an injector having a valve body opened and closed by an electromagnetic coil and a spring to inject the fuel in a desired amount into an internal combustion engine;

a fuel pressure regulator means for adjusting the pressure of the fuel to be injected from said injector;

an injector drive means for opening the valve body of said injector;

various sensors for detecting the operation conditions of said internal combustion engine; and an injection control means for controlling said fuel pressure regulator means and said injector drive means depending upon said operation conditions, so that the fuel is injected in an amount corresponding to said operation conditions from said injector; wherein said various sensors include at least a fuel pressure sensor for detecting said fuel pressure;

said injection control means includes an injector control unit that controls the time for opening said valve body by controlling the exciting current flowing into said electromagnetic coil and the excitation time depending upon said operation conditions and said fuel pressure;

said injector control unit includes a holding current control unit for setting the exciting current flowing into said electromagnetic coil as a holding current after said valve body has been opened; and wherein, said holding current control unit sets said holding current to a minimum value necessary for maintaining said valve body opened, sets said holding current to a large value when said fuel pressure is high and sets said holding current to a small value when said fuel pressure is low.

2. A fuel injection control device according to claim 1, wherein said holding current control unit sets said holding current depending upon the fully closing time required by said valve body to move from the fully opened position to the fully closed position when said exciting current is shut off, and sets said holding current to a large value when said fully closing time is short.

3. A fuel injection control device according to claim 2, wherein said holding current control unit includes map data in which said fully closing times based on said fuel pressures are corresponded to said holding currents, the holding currents in said map data being grouped into a plurality of steps depending on the ranges of said fully closing time.

4. A fuel injection control device according to claim 1, wherein said fuel injection control means includes a fuel pressure control unit for operating a target fuel pressure that serves as a target of control by said fuel pressure regulator means, said fuel pressure control unit working as said fuel pressure sensor and sending said target fuel pressure to said holding current control unit as data corresponding to said fuel pressure, and said holding current control unit setting said holding current depending on said target fuel pressure.

5. A fuel injection control device according to claim 1, wherein said injector control unit includes an over-excitation control unit for feeding a large over-exciting current at the time of opening said valve body.

6. A fuel injection control device according to claim 5, wherein said over-excitation control unit includes an over-excitation period control unit for adjusting the over-excitation period for feeding said over-exciting current depending on said fuel pressure, said over-excitation period control unit variably setting said over-excitation time within a required minimum range shorter than the time for exciting said electromagnetic coil, setting said over-excitation period to be long when said fuel pressure is high and setting said over-excitation period to be short when said fuel pressure is low.

7. A fuel injection control device according to claim 6, wherein said injection control means includes a fuel pressure control unit for operating a target fuel pressure that serves as a target of control by said fuel pressure regulator means, said fuel pressure control unit working as said fuel pressure sensor and sending said target fuel pressure to said over-excitation period control unit as data corresponding to said fuel pressure, and said over-excitation period control unit setting said over-excitation period depending upon said target fuel pressure.

* * * * *